US011873467B2

(12) United States Patent
Meier et al.

(10) Patent No.: US 11,873,467 B2
(45) **Date of Patent: *Jan. 16, 2024**

(54) WASHING AGENT WITH IMPROVED OPTICAL AND RHEOLOGICAL PROPERTIES

(71) Applicant: Henkel AG & Co. KGaA, Duesseldorf (DE)

(72) Inventors: Frank Meier, Duesseldorf (DE); Peter Schmiedel, Duesseldorf (DE); Daniel Thomas Piorkowski, Fairfield, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/937,291

(22) Filed: Jul. 23, 2020

(65) Prior Publication Data

US 2022/0025305 A1 Jan. 27, 2022

(51) Int. Cl.

| | |
|---|---|
| ***C11D 17/04*** | (2006.01) |
| ***C11D 1/02*** | (2006.01) |
| ***C11D 3/04*** | (2006.01) |
| ***C11D 3/12*** | (2006.01) |
| ***C11D 3/20*** | (2006.01) |
| ***D06L 1/00*** | (2017.01) |
| ***C11D 3/40*** | (2006.01) |
| ***C11D 11/00*** | (2006.01) |

(52) U.S. Cl.

CPC .............. *C11D 17/043* (2013.01); *C11D 1/02* (2013.01); *C11D 3/046* (2013.01); *C11D 3/1213* (2013.01); *C11D 3/2075* (2013.01); *C11D 3/40* (2013.01); *C11D 11/0017* (2013.01)

(58) Field of Classification Search

None

See application file for complete search history.

(56) References Cited

U.S. PATENT DOCUMENTS

| | | | | |
|---|---|---|---|---|
| 3,658,552 | A | 4/1972 | Carlson et al. | |
| 4,648,983 | A * | 3/1987 | Broze | C11D 3/323 510/501 |
| 6,855,680 | B2 | 2/2005 | Smerznak et al. | |
| 8,901,062 | B2 | 12/2014 | De Meirleir et al. | |
| 9,023,786 | B2 | 5/2015 | Schmiedel et al. | |
| 9,187,714 | B2 | 11/2015 | Schmiedel et al. | |
| 2003/0013630 | A1* | 1/2003 | Ishikawa | C11D 3/43 510/505 |
| 2015/0074921 | A1* | 3/2015 | Miracle | C09B 69/00 8/137 |
| 2015/0376550 | A1* | 12/2015 | Ohtani | C11D 17/042 510/296 |
| 2015/0376556 | A1* | 12/2015 | Ohtani | C11D 17/045 510/386 |
| 2016/0102278 | A1* | 4/2016 | Labeque | C11D 17/045 510/296 |
| 2016/0319227 | A1* | 11/2016 | Lant | C11D 11/0017 |
| 2017/0015948 | A1* | 1/2017 | Johnson | C11D 3/30 |
| 2017/0145359 | A1* | 5/2017 | Sambu | C11D 3/001 |
| 2018/0023043 | A1* | 1/2018 | Lant | C11D 1/143 510/296 |
| 2018/0037858 | A1* | 2/2018 | Keuleers | B65D 65/46 |
| 2018/0119067 | A1* | 5/2018 | Miracle | C11D 3/42 |
| 2019/0225743 | A1* | 7/2019 | Bekaert | C08G 63/6886 |

FOREIGN PATENT DOCUMENTS

| | | | |
|---|---|---|---|
| EP | 0922754 | A1 | 6/1999 |
| EP | 3124585 | A1 | 2/2017 |
| EP | 3202879 | A1 | 8/2017 |
| EP | 3517596 | A1 | 7/2019 |
| WO | 2010141301 | A1 | 12/2010 |
| WO | 2015148763 | A1 | 10/2015 |
| WO | 2016176280 | A1 | 11/2016 |

OTHER PUBLICATIONS

R. Weast, CRC Handbook of Chemistry and Physics, 1984, Chemical Rubber Publishing Company, 65th Edition, pp. B-154 to B-155.*

"Microplastic-Free, Opacified Liquid Laundry Detergents" U.S. Appl. No. 62/938,707 Piorkowski, Daniel Thomas et al., filed Nov. 21, 2019.

European Patent Office, PCT International Search Report, PCT/EP2021/067513, dated Apr. 10, 2021, pp. 1-15, HV Rijswijk—Pays Bas, NL.

* cited by examiner

*Primary Examiner* — Lorna M Douyon

(74) *Attorney, Agent, or Firm* — Bojuan Deng

(57) ABSTRACT

A flowable washing agent preparation containing, based on the total weight thereof, i) 20 to 80 wt. % surfactant; ii) 2 to 15 wt. % fatty acid; iii) 0.3 to 8 wt. % of the salt of a divalent cation; iv) 0.01 to 2 wt. % pigment; v) 8 to 35 wt. % solvent; and a washing method using same.

19 Claims, No Drawings

WASHING AGENT WITH IMPROVED OPTICAL AND RHEOLOGICAL PROPERTIES

FIELD OF THE INVENTION

The present invention relates to a flowable washing agent preparation and to methods for washing textiles using this washing agent preparation. In particular, this application relates to a washing agent preparation containing surfactant and salt.

BACKGROUND OF THE INVENTION

In addition to processing-related aspects, the commercial success of a washing agent is of course also determined by the ability to provide a product that meets consumer interests. An essential means of communicating product quality and product claims is the appearance of the product, including the shape and color of the portion unit. This applies to the liquid or solid washing agents themselves, and also to water-soluble film pouches, the soluble films of which are generally transparent and give a clear view of the solid or liquid washing agents contained. While colored, i.e. non-white, liquid washing agents can be obtained in a simple manner by adding appropriate dyes, the provision of white liquid washing agents is more challenging because the opacifying agents previously used for their production are increasingly being critically assessed from an ecological point of view. Against this background, the provision of an ecologically acceptable opacifying agent is a relevant development objective in the field of liquid washing and washing agents.

BRIEF SUMMARY OF THE INVENTION

The problem addressed by the application was that of providing visually appealing, concentrated washing agent portion units which can be produced in a simple and efficient manner and which are also particularly suitable for packaging in water-soluble film pouches.

The present invention firstly relates to a flowable washing agent preparation containing, based on the total weight thereof, i) 20 to 80 wt. % surfactant;
ii) 2 to 15 wt. % fatty acid;
iii) 0.3 to 8 wt. % salts of a divalent cation;
iv) 0.01 to 2 wt. % pigment;
v) 8 to 35 wt. % solvent.

The washing agent preparation is flowable under standard conditions (20° C., 1013 mbar).

DETAILED DESCRIPTION OF THE INVENTION

A first essential component of the washing agent preparation is the surfactant, which is contained in the washing agent preparation in an amount of 20 to 80 wt. %, preferably 30 to 75 wt. % and in particular 40 to 70 wt. %.

The group of surfactants includes the non-ionic, anionic, cationic and amphoteric surfactants. The group of surfactants also includes the co-surfactants described below. The compositions according to the invention can comprise one or more of the surfactants mentioned. Particularly preferred compositions contain at least one anionic surfactant as the surfactant.

The anionic surfactant is preferably selected from the group comprising $C_9$-$C_{13}$ alkylbenzene sulfonates, olefin sulfonates, $C_{12}$-$C_{18}$ alkane sulfonates, ester sulfonates, alk(en)yl sulfates, fatty alcohol ether sulfates and mixtures thereof. Compositions which comprise $C_9$-$C_{13}$ alkylbenzene sulfonates and fatty alcohol ether sulfates as the anionic surfactant have particularly good dispersing properties. Surfactants of the sulfonate type that can be used are preferably $C_9$-$C_{13}$ alkylbenzene sulfonates, olefin sulfonates, i.e. mixtures of alkene and hydroxyalkane sulfonates, and disulfonates, as obtained, for example, from $C_{12}$-$C_{18}$ monoolefins having a terminal or internal double bond by way of sulfonation with gaseous sulfur trioxide and subsequent alkaline or acid hydrolysis of the sulfonation products. $C_{12}$-$C_{18}$ alkane sulfonates and the esters of α-sulfofatty acids (ester sulfonates) are also suitable, for example the α-sulfonated methyl esters of hydrogenated coconut, palm kernel or tallow fatty acids.

The alkali salts and in particular the sodium salts of the sulfuric acid half-esters of $C_{12}$-$C_{18}$ fatty alcohols, for example from coconut fatty alcohol, tallow fatty alcohol, lauryl alcohol, myristyl alcohol, cetyl alcohol or stearyl alcohol, or of $C_{10}$-$C_{20}$ oxo alcohols and the half-esters of secondary alcohols having these chain lengths, are preferred as alk(en)yl sulfates. From a washing perspective, $C_{12}$-$C_{16}$ alkyl sulfates, $C_{12}$-$C_{15}$ alkyl sulfates and $C_{14}$-$C_{15}$ alkyl sulfates are preferred. 2,3-alkyl sulfates are also suitable anionic surfactants.

The salts of the sulfuric acid half-esters of fatty alcohols having 12 to 18 C atoms, for example from coconut fatty alcohol, tallow fatty alcohol, lauryl alcohol, myristyl alcohol, cetyl alcohol or stearyl alcohol, or of the oxo alcohols having 10 to 20 C atoms and the half-esters of secondary alcohols having these chain lengths, are preferred as alk(en)yl sulfates. From a washing perspective, the alkyl sulfates having 12 to 16 C atoms, alkyl sulfates having 12 to 15 C atoms and alkyl sulfates having 14 and 15 C atoms are preferred. 2,3-alkyl sulfates are also suitable anionic surfactants.

Fatty alcohol ether sulfates, such as the sulfuric acid monoesters of straight-chain or branched $C_7$-$C_{21}$ alcohols ethoxylated with 1 to 6 mol ethylene oxide, such as 2-methyl-branched $C_9$-11 alcohols having, on average, 3.5 mol ethylene oxide (EO) or C12-18 fatty alcohols having 1 to 4 EO, are also suitable. Alkyl ether sulfates of formula (A-1) are preferred:

$$R^1\text{—O-(AO)}_n\text{—}SO_3^-X^+ \quad \text{(A-1)}$$

In this formula (A-1), $R^1$ represents a linear or branched, substituted or unsubstituted alkyl functional group, preferably a linear, unsubstituted alkyl functional group, particularly preferably a fatty alcohol functional group. Preferred functional groups $R^1$ of formula (A-1) are selected from decyl, undecyl, dodecyl, tridecyl, tetradecyl, pentadecyl, hexadecyl, heptadecyl, octadecyl, nonadecyl, eicosyl functional groups and mixtures thereof, the representatives having an even number of C atoms being preferred. Particularly preferred functional groups $R^1$ of formula (A-1) are derived from fatty alcohols having 12 to 18 C atoms, for example from coconut fatty alcohol, tallow fatty alcohol, lauryl alcohol, myristyl alcohol, cetyl alcohol or stearyl alcohol, or from oxo alcohols having 10 to 20 C atoms.

In formula (A-1), AO represents an ethylene oxide (EO) or propylene oxide (PO) group, preferably an ethylene oxide group. The index n in formula (A-1) is an integer of from 1 to 50, preferably from 1 to 20, and in particular from 2 to 10. Very particularly preferably, n is 2, 3, 4, 5, 6, 7 or 8. X is a monovalent cation or the n-th part of an n-valent cation, the alkali metal ions, including $Na^+$ or $K^+$, being preferred in this case, with $Na^+$ being most preferred. Further cations $X^+$ may be selected from $NH_4^+$, ½ $Zn^{2+}$, ½ $Mg^{2+}$, ½ $Ca^{2+}$, ½ $Mn^{2+}$, and mixtures thereof.

Particularly preferred compositions contain an alkyl ether sulfate selected from fatty alcohol ether sulfates of formula A-2

(A-2)

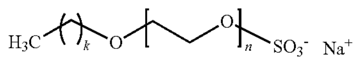

where k=11 to 19, and n=2, 3, 4, 5, 6, 7 or 8. Very particularly preferred representatives are Na fatty alcohol ether sulfates having 12 to 18 C atoms and 2 EO (k=11 to 13, n=2 in formula A-1). The degree of ethoxylation indicated represents a statistical average that can correspond to an integer or a fractional number for a specific product. The degrees of alkoxylation indicated represent statistical averages that can correspond to an integer or a fractional number for a specific product. Preferred alkoxylates/ethoxylates have a narrowed homolog distribution (narrow range ethoxylates, NRE).

In a particularly preferred embodiment, the composition contains $C_{9-13}$ alkylbenzene sulfonates and optionally also fatty alcohol ether sulfates as the anionic surfactant.

It is very particularly preferred for the composition to contain at least one anionic surfactant of formula (A-3)

(A-3)

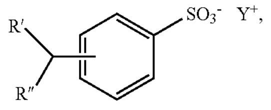

in which

R' and R" are, independently, H or alkyl, and together contain 9 to 19, preferably 9 to 15 and in particular 9 to 13, C atoms, and $Y^+$ denotes a monovalent cation or the n-th part of an n-valent cation (in particular $Na^+$).

In summary, preferred washing agent preparations contain, as the surfactant, at least one anionic surfactant, preferably at least one anionic surfactant from the group consisting of $C_{8-18}$ alkylbenzene sulfonates, $C_{8-18}$ olefin sulfonates, $C_{12-18}$ alkane sulfonates, $C_{8-18}$ ester sulfonates, $C_{8-18}$ alkyl sulfates, $C_{8-18}$ alkenyl sulfates, fatty alcohol ether sulfates, in particular at least one anionic surfactant from the group of $C_{8-18}$ alkylbenzene sulfonates.

The proportion by weight of the anionic surfactant with respect to the total weight of the flowable washing agent preparation is preferably 20 to 60 wt. % and in particular 25 to 50 wt. %.

In addition to the surfactant described above, the flowable washing agent preparation contains fatty acid as a second essential component. For the optical properties, the viscosity profile and the cleaning performance of the preparation, it has proven advantageous for the flowable washing agent preparation to contain, based on the total weight thereof, 4 to 12 wt. %, preferably 6 to 10 wt. %, fatty acid.

Preferred fatty acids are selected from the group of caprylic acid, capric acid, lauric acid, myristic acid, palmitic acid, stearic acid, oleic acid, linoleic acid and mixtures thereof.

As a third essential component, the flowable washing agent preparation contains the salt of a divalent cation. The proportion by weight of this salt with respect to the total weight of the flowable washing agent preparation is preferably 0.4 to 6 wt. % and in particular 0.5 to 4 wt. %. These proportions by weight have proven to be advantageous both in terms of the appearance and the viscosity of the preparation.

Because of their availability, magnesium or calcium salts are particularly preferably used, the salt of a divalent cation being particularly preferably selected from the group of the salts of divalent metal cations, in particular of magnesium and calcium salts, preferably from the group of magnesium chloride, magnesium sulfate, calcium chloride and calcium sulfate.

Preferred salts have a solubility in water (20° C.) above 400 g/L. The use of salts from the group of magnesium chloride and calcium chloride is very particularly preferred.

The washing agent preparation contains a pigment as a fourth essential component. Proportions by weight of the pigment with respect to the total weight of the flowable washing agent preparation of from 0.02 to 1.6% wt. %, preferably 0.05 to 1.2% wt. %, have proven to be advantageous for the change in color.

The pigments can be non-white (colored) or white. Preferred pigments are white pigments, with white pigments having a refractive index above 1.8, in particular above 2.0, with respect to the optical properties of the flowable washing agent preparation being particularly preferred. Particularly preferred pigments are titanium dioxide and zinc oxide.

The washing agent preparation contains a solvent as a fifth essential component. The proportion by weight of the solvent with respect to the total weight of the washing agent preparation is preferably 12 to 32 wt. % and in particular 15 to 30 wt. %. With regard to processability, it has proven to be advantageous for the flowable washing agent preparation to contain, based on the total weight thereof, 7 to 20 wt. %, preferably 10 to 18 wt. %, organic solvent.

Preferred organic solvents are selected from the group of ethanol, n-propanol, propanol, butanols, glycol, propanediol, butanediol, methylpropanediol, glycerol, diglycol, propyl diglycol, butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether, propylene glycol propyl ether, dipropylene glycol mono methyl ether, dipropylene glycol mono ethyl ether, methoxytriglycol, ethoxytriglycol, butoxytriglycol, 1-butoxyethoxy-2-propanol, 3-methyl-3-methoxybutanol, propylene-glycol-t-butylether, di-n-octylether and mixtures thereof, preferably from the group of propanediol, glycerol and mixtures thereof.

The liquid washing agent preparations are preferably low-water substance mixtures. Flowable washing agent preparations of this kind which contain, based on the total weight thereof, less than 18 wt. %, preferably less than 15 wt. %, water are preferred.

In summary, flowable washing agent preparations are preferred which contain, based on the total weight thereof, i) 20 to 80 wt. % surfactant including 20 to 50 wt. % anionic surfactant;
ii) 4 to 12 wt. % fatty acid;
iii) 0.5 to 4 wt. % of the salt of a divalent cation;
iv) 0.01 to 2 wt. % pigment;
v) 8 to 35 wt. % solvent.

The composition of some preferred flowable washing agent preparations can be derived from the following tables (amounts given in wt. % based on the total weight of the preparation, unless otherwise indicated).

| | Formula 1 | Formula 2 | Formula 3 | Formula 4 |
|---|---|---|---|---|
| Surfactant | 20 to 80 | 30 to 75 | 30 to 75 | 40 to 70 |
| Fatty acid | 2 to 15 | 4 to 12 | 4 to 12 | 6 to 10 |
| Salt of a divalent cation | 0.3 to 8 | 0.3 to 8 | 0.4 to 6 | 0.5 to 4 |
| White pigment | 0.01 to 2 | 0.02 to 1.6 | 0.02 to 1.6 | 0.05 to 1.2 |
| Solvent | 8 to 35 | 12 to 32 | 12 to 32 | 15 to 30 |
| Misc. | to make up to 100 | to make up to 100 | to make up to 100 | to make up to 100 |

| | Formula 6 | Formula 7 | Formula 8 | Formula 9 |
|---|---|---|---|---|
| Total surfactant | 20 to 80 | 30 to 75 | 30 to 75 | 40 to 70 |
| Anionic surfactant* | 20 to 60 | 20 to 60 | 20 to 50 | 20 to 50 |
| Fatty acid | 2 to 15 | 4 to 12 | 4 to 12 | 6 to 10 |
| Salt of a divalent cation | 0.3 to 8 | 0.3 to 8 | 0.4 to 6 | 0.5 to 4 |
| White pigment | 0.01 to 2 | 0.02 to 1.6 | 0.02 to 1.6 | 0.05 to 1.2 |
| Solvent | 8 to 35 | 12 to 32 | 12 to 32 | 15 to 30 |
| Misc. | to make up to 100 | to make up to 100 | to make up to 100 | to make up to 100 |

| | Formula 11 | Formula 12 | Formula 13 | Formula 14 |
|---|---|---|---|---|
| Surfactant | 20 to 80 | 30 to 75 | 30 to 75 | 40 to 70 |
| Fatty acid | 2 to 15 | 4 to 12 | 4 to 12 | 6 to 10 |
| Magnesium chloride, calcium chloride | 0.3 to 8 | 0.3 to 8 | 0.4 to 6 | 0.5 to 4 |
| White pigment | 0.01 to 2 | 0.02 to 1.6 | 0.02 to 1.6 | 0.05 to 1.2 |
| Solvent | 8 to 35 | 12 to 32 | 12 to 32 | 15 to 30 |
| Misc. | to make up to 100 | to make up to 100 | to make up to 100 | to make up to 100 |

| | Formula 16 | Formula 17 | Formula 18 | Formula 19 |
|---|---|---|---|---|
| Total surfactant | 20 to 80 | 30 to 75 | 30 to 75 | 40 to 70 |
| Anionic surfactant* | 20 to 60 | 20 to 60 | 20 to 50 | 20 to 50 |
| Fatty acid | 2 to 15 | 4 to 12 | 4 to 12 | 6 to 10 |
| Magnesium chloride, calcium chloride | 0.3 to 8 | 0.3 to 8 | 0.4 to 6 | 0.5 to 4 |
| White pigment | 0.01 to 2 | 0.02 to 1.6 | 0.02 to 1.6 | 0.05 to 1.2 |
| Solvent | 8 to 35 | 12 to 32 | 12 to 32 | 15 to 30 |
| Misc. | to make up to 100 | to make up to 100 | to make up to 100 | to make up to 100 |

| | Formula 21 | Formula 22 | Formula 23 | Formula 24 |
|---|---|---|---|---|
| Surfactant | 20 to 80 | 30 to 75 | 30 to 75 | 40 to 70 |
| Fatty acid | 2 to 15 | 4 to 12 | 4 to 12 | 6 to 10 |
| Salt of a divalent cation | 0.3 to 8 | 0.3 to 8 | 0.4 to 6 | 0.5 to 4 |
| White pigment | 0.01 to 2 | 0.02 to 1.6 | 0.02 to 1.6 | 0.05 to 1.2 |
| Total solvent | 8 to 35 | 12 to 32 | 12 to 32 | 15 to 30 |
| Organic solvent | 7 to 20 | 7 to 20 | 10 to 18 | 10 to 18 |
| Water | <18 | <18 | <8 | <8 |
| Misc. | to make up to 100 | to make up to 100 | to make up to 100 | to make up to 100 |

| | Formula 26 | Formula 27 | Formula 28 | Formula 29 |
|---|---|---|---|---|
| Total surfactant | 20 to 80 | 30 to 75 | 30 to 75 | 40 to 70 |
| Anionic surfactant* | 20 to 60 | 20 to 60 | 20 to 50 | 20 to 50 |
| Fatty acid | 2 to 15 | 4 to 12 | 4 to 12 | 6 to 10 |
| Magnesium chloride, calcium chloride | 0.3 to 8 | 0.3 to 8 | 0.4 to 6 | 0.5 to 4 |
| White pigment | 0.01 to 2 | 0.02 to 1.6 | 0.02 to 1.6 | 0.05 to 1.2 |
| Solvent | 8 to 35 | 12 to 32 | 12 to 32 | 15 to 30 |
| Misc. | to make up to 100 | to make up to 100 | to make up to 100 | to make up to 100 |

| | Formula 31 | Formula 32 | Formula 33 | Formula 34 |
|---|---|---|---|---|
| Surfactant | 20 to 80 | 30 to 75 | 30 to 75 | 40 to 70 |
| Fatty acid | 2 to 15 | 4 to 12 | 4 to 12 | 6 to 10 |
| Salt of a divalent cation | 0.3 to 8 | 0.3 to 8 | 0.4 to 6 | 0.5 to 4 |
| White pigment | 0.01 to 2 | 0.02 to 1.6 | 0.02 to 1.6 | 0.05 to 1.2 |
| Total solvent | 8 to 35 | 12 to 32 | 12 to 32 | 15 to 30 |
| Organic solvent | 7 to 20 | 7 to 20 | 10 to 18 | 10 to 18 |
| Water | <18 | <18 | <15 | <15 |
| Misc. | to make up | to make up | to make up | to make up |

-continued

| | to 100 | to 100 | to 100 | to 100 |
|---|---|---|---|---|
| | Formula 36 | Formula 37 | Formula 38 | Formula 39 |
| Total surfactant | 20 to 80 | 30 to 75 | 30 to 75 | 40 to 70 |
| Anionic surfactant* | 20 to 60 | 20 to 60 | 20 to 50 | 20 to 50 |
| Fatty acid | 2 to 15 | 4 to 12 | 4 to 12 | 6 to 10 |
| Magnesium chloride, calcium chloride | 0.3 to 8 | 0.3 to 8 | 0.4 to 6 | 0.5 to 4 |
| White pigment | 0.01 to 2 | 0.02 to 1.6 | 0.02 to 1.6 | 0.05 to 1.2 |
| Total solvent | 8 to 35 | 12 to 32 | 12 to 32 | 15 to 30 |
| Organic solvent | 7 to 20 | 7 to 20 | 10 to 18 | 10 to 18 |
| Water | <18 | <18 | <15 | <15 |
| Misc. | to make up to 100 | to make up to 100 | to make up to 100 | to make up to 100 |

*preferably $C_{8-18}$ alkylbenzene sulfonates

In a technically advantageous variant, the flowable washing agent preparation also contains, based on the total weight thereof, vi) 0.5 to 4 wt. %, preferably 0.5 to 3 wt. % and in particular 0.5 to 2 wt. %, of the salt of a monovalent cation.

By adding the monovalent cation, the cloudy-white appearance of the washing agent preparation is enhanced. At the same time, the resulting compositions are distinguished by optimal viscosity properties. In particular, the addition of the monovalent cation in large proportions by weight causes sufficient turbidity without increasing the viscosity of the washing agent preparation in a manner which makes it difficult to convey in pipe systems. Finally, the addition of the salt of a monovalent cation reduces the temperature dependence of the viscosity of the flowable washing agent preparation and thus simplifies the processing thereof.

The use of monovalent metal salts, in particular the use of sodium chloride, also improves the storage stability, in particular the storage stability in the case of temperature fluctuations.

Preferred monovalent cations are selected from the group of monovalent metal cations. Because of their availability and low costs, preferred salts of monovalent cations are selected from the group of sodium chloride, potassium chloride, sodium sulfate, sodium carbonate, potassium sulfate, potassium carbonate, sodium hydrogen carbonate, potassium hydrogen carbonate, very preferably from the group of sodium chloride.

In summary, a second particularly preferred embodiment of the flowable washing agent preparation contains, based on the total weight thereof, i) 20 to 80 wt. % surfactant including 20 to 50 wt. % anionic surfactant;
ii) 4 to 12 wt. % fatty acid;
iii) 0.5 to 4 wt. % of the salt of a divalent metal cation;
iv) 0.01 to 2 wt. % pigment;
v) 8 to 35 wt. % solvent;
vi) 0.5 to 4 wt. % of the salt of a monovalent metal cation.

The composition of some further particularly preferred flowable washing agent preparations can be derived from the following tables (amounts given in wt. % based on the total weight of the preparation, unless otherwise indicated).

| | Formula 1a | Formula 2a | Formula 3a | Formula 4a |
|---|---|---|---|---|
| Surfactant | 20 to 80 | 30 to 75 | 30 to 75 | 40 to 70 |
| Fatty acid | 2 to 15 | 4 to 12 | 4 to 12 | 6 to 10 |
| Salt of a divalent cation | 0.3 to 8 | 0.3 to 8 | 0.4 to 6 | 0.5 to 4 |
| Salt of a monovalent cation | 0.5 to 4 | 0.5 to 3 | 0.5 to 3 | 0.5 to 2 |
| White pigment | 0.01 to 2 | 0.02 to 1.6 | 0.02 to 1.6 | 0.05 to 1.2 |
| Solvent | 8 to 35 | 12 to 32 | 12 to 32 | 15 to 30 |
| Misc. | to make up to 100 | to make up to 100 | to make up to 100 | to make up to 100 |
| | Formula 6a | Formula 7a | Formula 8a | Formula 9a |
| Total surfactant | 20 to 80 | 30 to 75 | 30 to 75 | 40 to 70 |
| Anionic surfactant* | 20 to 60 | 20 to 60 | 20 to 50 | 20 to 50 |
| Fatty acid | 2 to 15 | 4 to 12 | 4 to 12 | 6 to 10 |
| Salt of a divalent cation | 0.3 to 8 | 0.3 to 8 | 0.4 to 6 | 0.5 to 4 |
| Salt of a monovalent cation | 0.5 to 4 | 0.5 to 3 | 0.5 to 3 | 0.5 to 2 |
| White pigment | 0.01 to 2 | 0.02 to 1.6 | 0.02 to 1.6 | 0.05 to 1.2 |
| Solvent | 8 to 35 | 12 to 32 | 12 to 32 | 15 to 30 |
| Misc. | to make up to 100 | to make up to 100 | to make up to 100 | to make up to 100 |
| | Formula 11a | Formula 12a | Formula 13a | Formula 14a |
| Surfactant | 20 to 80 | 30 to 75 | 30 to 75 | 40 to 70 |
| Fatty acid | 2 to 15 | 4 to 12 | 4 to 12 | 6 to 10 |
| Magnesium chloride, calcium chloride | 0.3 to 8 | 0.3 to 8 | 0.4 to 6 | 0.5 to 4 |
| Salt of a monovalent cation | 0.5 to 4 | 0.5 to 3 | 0.5 to 3 | 0.5 to 2 |
| White pigment | 0.01 to 2 | 0.02 to 1.6 | 0.02 to 1.6 | 0.05 to 1.2 |

-continued

| | | | | |
|---|---|---|---|---|
| Solvent | 8 to 35 | 12 to 32 | 12 to 32 | 15 to 30 |
| Misc. | to make up to 100 | to make up to 100 | to make up to 100 | to make up to 100 |

| | Formula 16a | Formula 17a | Formula 18a | Formula 19a |
|---|---|---|---|---|
| Total surfactant | 20 to 80 | 30 to 75 | 30 to 75 | 40 to 70 |
| Anionic surfactant* | 20 to 60 | 20 to 60 | 20 to 50 | 20 to 50 |
| Fatty acid | 2 to 15 | 4 to 12 | 4 to 12 | 6 to 10 |
| Magnesium chloride, calcium chloride | 0.3 to 8 | 0.3 to 8 | 0.4 to 6 | 0.5 to 4 |
| Salt of a monovalent cation | 0.5 to 4 | 0.5 to 3 | 0.5 to 3 | 0.5 to 2 |
| White pigment | 0.01 to 2 | 0.02 to 1.6 | 0.02 to 1.6 | 0.05 to 1.2 |
| Solvent | 8 to 35 | 12 to 32 | 12 to 32 | 15 to 30 |
| Misc. | to make up to 100 | to make up to 100 | to make up to 100 | to make up to 100 |

| | Formula 21a | Formula 22a | Formula 23a | Formula 24a |
|---|---|---|---|---|
| Surfactant | 20 to 60 | 20 to 60 | 20 to 50 | 20 to 50 |
| Fatty acid | 2 to 15 | 4 to 12 | 4 to 12 | 6 to 10 |
| Salt of a divalent cation | 0.3 to 8 | 0.3 to 8 | 0.4 to 6 | 0.5 to 4 |
| Sodium chloride | 0.5 to 4 | 0.5 to 3 | 0.5 to 3 | 0.5 to 2 |
| White pigment | 0.01 to 2 | 0.02 to 1.6 | 0.02 to 1.6 | 0.05 to 1.2 |
| Solvent | 8 to 35 | 12 to 32 | 12 to 32 | 15 to 30 |
| Misc. | to make up to 100 | to make up to 100 | to make up to 100 | to make up to 100 |

| | Formula 26a | Formula 27a | Formula 28a | Formula 29a |
|---|---|---|---|---|
| Total surfactant | 20 to 80 | 30 to 75 | 30 to 75 | 40 to 70 |
| Anionic surfactant* | 20 to 60 | 20 to 60 | 20 to 50 | 20 to 50 |
| Fatty acid | 2 to 15 | 4 to 12 | 4 to 12 | 6 to 10 |
| Salt of a divalent cation | 0.3 to 8 | 0.3 to 8 | 0.4 to 6 | 0.5 to 4 |
| Sodium chloride | 0.5 to 4 | 0.5 to 3 | 0.5 to 3 | 0.5 to 2 |
| White pigment | 0.01 to 2 | 0.02 to 1.6 | 0.02 to 1.6 | 0.05 to 1.2 |
| Solvent | 8 to 35 | 12 to 32 | 12 to 32 | 15 to 30 |
| Misc. | to make up to 100 | to make up to 100 | to make up to 100 | to make up to 100 |

| | Formula 31a | Formula 32a | Formula 33a | Formula 34a |
|---|---|---|---|---|
| Surfactant | 20 to 60 | 20 to 60 | 20 to 50 | 20 to 50 |
| Fatty acid | 2 to 15 | 4 to 12 | 4 to 12 | 6 to 10 |
| Magnesium chloride, calcium chloride | 0.3 to 8 | 0.3 to 8 | 0.4 to 6 | 0.5 to 4 |
| Sodium chloride | 0.5 to 4 | 0.5 to 3 | 0.5 to 3 | 0.5 to 2 |
| White pigment | 0.01 to 2 | 0.02 to 1.6 | 0.02 to 1.6 | 0.05 to 1.2 |
| Solvent | 8 to 35 | 12 to 32 | 12 to 32 | 15 to 30 |
| Misc. | to make up to 100 | to make up to 100 | to make up to 100 | to make up to 100 |

| | Formula 36a | Formula 37a | Formula 38a | Formula 39a |
|---|---|---|---|---|
| Total surfactant | 20 to 80 | 30 to 75 | 30 to 75 | 40 to 70 |
| Anionic surfactant* | 20 to 60 | 20 to 60 | 20 to 50 | 20 to 50 |
| Fatty acid | 2 to 15 | 4 to 12 | 4 to 12 | 6 to 10 |
| Magnesium chloride, calcium chloride | 0.3 to 8 | 0.3 to 8 | 0.4 to 6 | 0.5 to 4 |
| Sodium chloride | 0.5 to 4 | 0.5 to 3 | 0.5 to 3 | 0.5 to 2 |
| White pigment | 0.01 to 2 | 0.02 to 1.6 | 0.02 to 1.6 | 0.05 to 1.2 |
| Solvent | 8 to 35 | 12 to 32 | 12 to 32 | 15 to 30 |
| Misc. | to make up to 100 | to make up to 100 | to make up to 100 | to make up to 100 |

| | Formula 41a | Formula 42a | Formula 43a | Formula 44a |
|---|---|---|---|---|
| Surfactant | 20 to 80 | 30 to 75 | 30 to 75 | 40 to 70 |
| Fatty acid | 2 to 15 | 4 to 12 | 4 to 12 | 6 to 10 |
| Salt of a divalent cation | 0.3 to 8 | 0.3 to 8 | 0.4 to 6 | 0.5 to 4 |
| Salt of a monovalent cation | 0.5 to 4 | 0.5 to 3 | 0.5 to 3 | 0.5 to 2 |
| White pigment | 0.01 to 2 | 0.02 to 1.6 | 0.02 to 1.6 | 0.05 to 1.2 |
| Total solvent | 8 to 35 | 12 to 32 | 12 to 32 | 15 to 30 |
| Organic solvent | 7 to 20 | 7 to 20 | 10 to 18 | 10 to 18 |
| Water | <18 | <18 | <15 | <15 |
| Misc. | to make up to 100 | to make up to 100 | to make up to 100 | to make up to 100 |

-continued

| | Formula 46a | Formula 47a | Formula 48a | Formula 49a |
|---|---|---|---|---|
| Total surfactant | 20 to 80 | 30 to 75 | 30 to 75 | 40 to 70 |
| Anionic surfactant* | 20 to 60 | 20 to 60 | 20 to 50 | 20 to 50 |
| Fatty acid | 2 to 15 | 4 to 12 | 4 to 12 | 6 to 10 |
| Salt of a divalent cation | 0.3 to 8 | 0.3 to 8 | 0.4 to 6 | 0.5 to 4 |
| Salt of a monovalent cation | 0.5 to 4 | 0.5 to 3 | 0.5 to 3 | 0.5 to 2 |
| White pigment | 0.01 to 2 | 0.02 to 1.6 | 0.02 to 1.6 | 0.05 to 1.2 |
| Total solvent | 8 to 35 | 12 to 32 | 12 to 32 | 15 to 30 |
| Organic solvent | 7 to 20 | 7 to 20 | 10 to 18 | 10 to 18 |
| Water | <18 | <18 | <15 | <15 |
| Misc. | to make up to 100 | to make up to 100 | to make up to 100 | to make up to 100 |

| | Formula 51a | Formula 52a | Formula 53a | Formula 54a |
|---|---|---|---|---|
| Surfactant | 20 to 80 | 30 to 75 | 30 to 75 | 40 to 70 |
| Fatty acid | 2 to 15 | 4 to 12 | 4 to 12 | 6 to 10 |
| Magnesium chloride, calcium chloride | 0.3 to 8 | 0.3 to 8 | 0.4 to 6 | 0.5 to 4 |
| Sodium chloride | 0.5 to 4 | 0.5 to 3 | 0.5 to 3 | 0.5 to 2 |
| White pigment | 0.01 to 2 | 0.02 to 1.6 | 0.02 to 1.6 | 0.05 to 1.2 |
| Total solvent | 8 to 35 | 12 to 32 | 12 to 32 | 15 to 30 |
| Organic solvent | 7 to 20 | 7 to 20 | 10 to 18 | 10 to 18 |
| Water | <18 | <18 | <15 | <15 |
| Misc. | to make up to 100 | to make up to 100 | to make up to 100 | to make up to 100 |

| | Formula 56a | Formula 57a | Formula 58a | Formula 59a |
|---|---|---|---|---|
| Total surfactant | 20 to 80 | 30 to 75 | 30 to 75 | 40 to 70 |
| Anionic surfactant* | 20 to 60 | 20 to 60 | 20 to 50 | 20 to 50 |
| Fatty acid | 2 to 15 | 4 to 12 | 4 to 12 | 6 to 10 |
| Magnesium chloride, calcium chloride | 0.3 to 8 | 0.3 to 8 | 0.4 to 6 | 0.5 to 4 |
| Sodium chloride | 0.5 to 4 | 0.5 to 3 | 0.5 to 3 | 0.5 to 2 |
| White pigment | 0.01 to 2 | 0.02 to 1.6 | 0.02 to 1.6 | 0.05 to 1.2 |
| Total solvent | 8 to 35 | 12 to 32 | 12 to 32 | 15 to 30 |
| Organic solvent | 7 to 20 | 7 to 20 | 10 to 18 | 10 to 18 |
| Water | <18 | <18 | <15 | <15 |
| Misc. | to make up to 100 | to make up to 100 | to make up to 100 | to make up to 100 |

*preferably $C_{8-18}$ alkylbenzene sulfonates

In a further technically advantageous variant, the flowable washing agent preparation contains, based on the total weight thereof, 12 to 30 wt. %, preferably 15 to 25 wt. %, of a non-ionic surfactant and particularly preferably also 0.3 to 5 wt. % of a non-ionic co-surfactant that differs from the non-ionic surfactant.

Preferred non-ionic surfactants are selected from the group of alkoxylated primary $C_{8-18}$ alcohols having a degree of alkoxylation of ≥4, particularly preferably the $C_{12-14}$ alcohols having 4 EO or 7 EO, the $C_{9-11}$ alcohols having 7 EO, the $C_{13-15}$ alcohols having 5 EO, 7 EO or 8 EO, the $C_{13-15}$ oxo alcohols having 7 EO, the $C_{12-18}$ alcohols having 5 EO or 7 EO, the $C_{13-15}$ oxo alcohols having 7 EO, in particular the primary $C_{12-18}$ alcohols having a degree of alkoxylation of ≥4, very particularly preferably the primary $C_{12-18}$ alcohols having 7 EO.

With regard to the rheological properties of the first flowable washing agent preparation and the processability thereof, it has proven to be advantageous to use anionic surfactant and non-ionic surfactant in a weight ratio of from 3:1 to 1:2, preferably from 2:1 to 1:1.5 and in particular from 1.4:1 to 1:1.

It has proven to be technically advantageous to supplement the previously described surfactant system consisting of anionic and non-ionic surfactant with a further co-surfactant. The proportion by weight of the co-surfactant with respect to the total weight of the flowable washing agent preparation is preferably 0.3 to 5 wt. %. In the context of this application, the co-surfactants are not included in the surfactants described further above. Preferred co-surfactants are selected from the group consisting of alkoxylated primary $C_8$-$C_{18}$ alcohols having a degree of alkoxylation of ≤3, aliphatic $C_6$-$C_{14}$ alcohols, aromatic $C_6$-$C_{14}$ alcohols, aliphatic $C_6$-$C_{12}$ dialcohols, monoglycerides of $C_{12}$-$C_{18}$ fatty acids, monoglycerol ethers of $C_8$-$C_{18}$ fatty alcohols, in particular from the group of alkoxylated primary $C_{12}$-$C_{18}$ alcohols having a degree of alkoxylation of ≤3.

In summary, a third particularly preferred embodiment of the flowable washing agent preparation contains, based on the total weight thereof, i) 32.3 to 80 wt. % surfactant including 20 to 50 wt. % anionic surfactant and 12 to 30 wt. % non-ionic surfactant;
ii) 4 to 12 wt. % fatty acid;
iii) 0.5 to 4 wt. % of the salt of a divalent cation;
iv) 0.01 to 2 wt. % pigment;
v) 8 to 35 wt. % solvent.
vi) 0.3 to 5 wt. % of a co-surfactant that differs from the non-ionic surfactant and is selected from the group consisting of alkoxylated primary $C_8$-$C_{18}$ alcohols having a degree of alkoxylation of 3, aliphatic $C_6$-$C_{14}$ alcohols, aromatic $C_6$-$C_{14}$ alcohols, aliphatic $C_6$-$C_{12}$ dialcohols, monoglycerides of $C_{12}$-$C_{18}$ fatty acids, monoglycerol ethers of $C_8$-$C_{18}$ fatty alcohols, in particular from the group of alkoxylated primary $C_{12}$-$C_{18}$ alcohols having a degree of alkoxylation of ≤3.

The composition of some further particularly preferred flowable washing agent preparations can be derived from the following tables (amounts given in wt. % based on the total weight of the preparation, unless otherwise indicated).

| | Formula 1b | Formula 2b | Formula 3b | Formula 4b |
|---|---|---|---|---|
| Total surfactant | 32.3 to 80 | 32.3 to 75 | 35.5 to 75 | 40 to 70 |
| Anionic surfactant* | 20 to 60 | 20 to 60 | 20 to 50 | 20 to 50 |
| Non-ionic surfactant | 12 to 30 | 12 to 30 | 15 to 25 | 15 to 25 |
| Co-surfactant** | 0.3 to 5 | 0.3 to 5 | 0.5 to 4 | 0.5 to 4 |
| Fatty acid | 2 to 15 | 4 to 12 | 4 to 12 | 6 to 10 |
| Salt of a divalent cation | 0.3 to 8 | 0.3 to 8 | 0.4 to 6 | 0.5 to 4 |
| White pigment | 0.01 to 2 | 0.02 to 1.6 | 0.02 to 1.6 | 0.05 to 1.2 |
| Solvent | 8 to 35 | 12 to 32 | 12 to 32 | 15 to 30 |
| Misc. | to make up to 100 | to make up to 100 | to make up to 100 | to make up to 100 |

| | Formula 6b | Formula 7b | Formula 8b | Formula 9b |
|---|---|---|---|---|
| Total surfactant | 32.3 to 80 | 32.3 to 75 | 35.5 to 75 | 40 to 70 |
| Anionic surfactant* | 20 to 60 | 20 to 60 | 20 to 50 | 20 to 50 |
| Non-ionic surfactant | 12 to 30 | 12 to 30 | 15 to 25 | 15 to 25 |
| Co-surfactant** | 0.3 to 5 | 0.3 to 5 | 0.5 to 4 | 0.5 to 4 |
| Fatty acid | 2 to 15 | 4 to 12 | 4 to 12 | 6 to 10 |
| Magnesium chloride, calcium chloride | 0.3 to 8 | 0.3 to 8 | 0.4 to 6 | 0.5 to 4 |
| White pigment | 0.01 to 2 | 0.02 to 1.6 | 0.02 to 1.6 | 0.05 to 1.2 |
| Solvent | 8 to 35 | 12 to 32 | 12 to 32 | 15 to 30 |
| Misc. | to make up to 100 | to make up to 100 | to make up to 100 | to make up to 100 |

| | Formula 11b | Formula 12b | Formula 13b | Formula 14b |
|---|---|---|---|---|
| Total surfactant | 32.3 to 80 | 32.3 to 75 | 35.5 to 75 | 40 to 70 |
| Anionic surfactant* | 20 to 60 | 20 to 60 | 20 to 50 | 20 to 50 |
| Non-ionic surfactant | 12 to 30 | 12 to 30 | 15 to 25 | 15 to 25 |
| Co-surfactant** | 0.3 to 5 | 0.3 to 5 | 0.5 to 4 | 0.5 to 4 |
| Fatty acid | 2 to 15 | 4 to 12 | 4 to 12 | 6 to 10 |
| Salt of a divalent cation | 0.3 to 8 | 0.3 to 8 | 0.4 to 6 | 0.5 to 4 |
| White pigment | 0.01 to 2 | 0.02 to 1.6 | 0.02 to 1.6 | 0.05 to 1.2 |
| Total solvent | 8 to 35 | 12 to 32 | 12 to 32 | 15 to 30 |
| Organic solvent | 7 to 20 | 7 to 20 | 10 to 18 | 10 to 18 |
| Water | <18 | <18 | <15 | <15 |
| Misc. | to make up to 100 | to make up to 100 | to make up to 100 | to make up to 100 |

| | Formula 16b | Formula 17b | Formula 18b | Formula 19b |
|---|---|---|---|---|
| Total surfactant | 32.3 to 80 | 32.3 to 75 | 35.5 to 75 | 40 to 70 |
| Anionic surfactant* | 20 to 60 | 20 to 60 | 20 to 50 | 20 to 50 |
| Non-ionic surfactant | 12 to 30 | 12 to 30 | 15 to 25 | 15 to 25 |
| Co-surfactant** | 0.3 to 5 | 0.3 to 5 | 0.5 to 4 | 0.5 to 4 |
| Fatty acid | 2 to 15 | 4 to 12 | 4 to 12 | 6 to 10 |
| Magnesium chloride, calcium chloride | 0.3 to 8 | 0.3 to 8 | 0.4 to 6 | 0.5 to 4 |
| White pigment | 0.01 to 2 | 0.02 to 1.6 | 0.02 to 1.6 | 0.05 to 1.2 |
| Total solvent | 8 to 35 | 12 to 32 | 12 to 32 | 15 to 30 |
| Organic solvent | 7 to 20 | 7 to 20 | 10 to 18 | 10 to 18 |
| Water | <18 | <18 | <15 | <15 |
| Misc. | to make up to 100 | to make up to 100 | to make up to 100 | to make up to 100 |

| | Formula 21b | Formula 22b | Formula 23b | Formula 24b |
|---|---|---|---|---|
| Total surfactant | 32.3 to 80 | 32.3 to 75 | 35.5 to 75 | 40 to 70 |
| Anionic surfactant* | 20 to 60 | 20 to 60 | 20 to 50 | 20 to 50 |
| Non-ionic surfactant*** | 12 to 30 | 12 to 30 | 15 to 25 | 15 to 25 |
| Co-surfactant**** | 0.3 to 5 | 0.3 to 5 | 0.5 to 4 | 0.5 to 4 |
| Fatty acid | 2 to 15 | 4 to 12 | 4 to 12 | 6 to 10 |
| Salt of a divalent cation | 0.3 to 8 | 0.3 to 8 | 0.4 to 6 | 0.5 to 4 |
| White pigment | 0.01 to 2 | 0.02 to 1.6 | 0.02 to 1.6 | 0.05 to 1.2 |
| Solvent | 8 to 35 | 12 to 32 | 12 to 32 | 15 to 30 |
| Misc. | to make up to 100 | to make up to 100 | to make up to 100 | to make up to 100 |

| | Formula 26b | Formula 27b | Formula 28b | Formula 29b |
|---|---|---|---|---|
| Total surfactant | 32.3 to 80 | 32.3 to 75 | 35.5 to 75 | 40 to 70 |
| Anionic surfactant* | 20 to 60 | 20 to 60 | 20 to 50 | 20 to 50 |
| Non-ionic surfactant*** | 12 to 30 | 12 to 30 | 15 to 25 | 15 to 25 |
| Co-surfactant**** | 0.3 to 5 | 0.3 to 5 | 0.5 to 4 | 0.5 to 4 |
| Fatty acid | 2 to 15 | 4 to 12 | 4 to 12 | 6 to 10 |
| Magnesium chloride, calcium chloride | 0.3 to 8 | 0.3 to 8 | 0.4 to 6 | 0.5 to 4 |
| White pigment | 0.01 to 2 | 0.02 to 1.6 | 0.02 to 1.6 | 0.05 to 1.2 |

-continued

| | | | | |
|---|---|---|---|---|
| Solvent | 8 to 35 | 12 to 32 | 12 to 32 | 15 to 30 |
| Misc. | to make up to 100 | to make up to 100 | to make up to 100 | to make up to 100 |

| | Formula 31b | Formula 32b | Formula 33b | Formula 34b |
|---|---|---|---|---|
| Total surfactant | 32.3 to 80 | 32.3 to 75 | 35.5 to 75 | 40 to 70 |
| Anionic surfactant* | 20 to 60 | 20 to 60 | 20 to 50 | 20 to 50 |
| Non-ionic surfactant*** | 12 to 30 | 12 to 30 | 15 to 25 | 15 to 25 |
| Co-surfactant**** | 0.3 to 5 | 0.3 to 5 | 0.5 to 4 | 0.5 to 4 |
| Fatty acid | 2 to 15 | 4 to 12 | 4 to 12 | 6 to 10 |
| Salt of a divalent cation | 0.3 to 8 | 0.3 to 8 | 0.4 to 6 | 0.5 to 4 |
| White pigment | 0.01 to 2 | 0.02 to 1.6 | 0.02 to 1.6 | 0.05 to 1.2 |
| Total solvent | 8 to 35 | 12 to 32 | 12 to 32 | 15 to 30 |
| Organic solvent | 7 to 20 | 7 to 20 | 10 to 18 | 10 to 18 |
| Water | <18 | <18 | <15 | <15 |
| Misc. | to make up to 100 | to make up to 100 | to make up to 100 | to make up to 100 |

| | Formula 36b | Formula 37b | Formula 38b | Formula 39b |
|---|---|---|---|---|
| Total surfactant | 32.3 to 80 | 32.3 to 75 | 35.5 to 75 | 40 to 70 |
| Anionic surfactant* | 20 to 60 | 20 to 60 | 20 to 50 | 20 to 50 |
| Non-ionic surfactant*** | 12 to 30 | 12 to 30 | 15 to 25 | 15 to 25 |
| Co-surfactant**** | 0.3 to 5 | 0.3 to 5 | 0.5 to 4 | 0.5 to 4 |
| Fatty acid | 2 to 15 | 4 to 12 | 4 to 12 | 6 to 10 |
| Magnesium chloride, calcium chloride | 0.3 to 8 | 0.3 to 8 | 0.4 to 6 | 0.5 to 4 |
| White pigment | 0.01 to 2 | 0.02 to 1.6 | 0.02 to 1.6 | 0.05 to 1.2 |
| Total solvent | 8 to 35 | 12 to 32 | 12 to 32 | 15 to 30 |
| Organic solvent | 7 to 20 | 7 to 20 | 10 to 18 | 10 to 18 |
| Water | <18 | <18 | <15 | <15 |
| Misc. | to make up to 100 | to make up to 100 | to make up to 100 | to make up to 100 |

| | Formula 41b | Formula 42b | Formula 43b | Formula 44b |
|---|---|---|---|---|
| Total surfactant | 32.3 to 80 | 32.3 to 75 | 35.5 to 75 | 40 to 70 |
| $C_{8-18}$ alkylbenzene sulfonate | 20 to 60 | 20 to 60 | 20 to 50 | 20 to 50 |
| Primary $C_{12-18}$ alcohols with 7 EO | 12 to 30 | 12 to 30 | 15 to 25 | 15 to 25 |
| $C_{13}$ alcohols with 2 EO or 3 EO | 0.3 to 5 | 0.3 to 5 | 0.5 to 4 | 0.5 to 4 |
| Fatty acid | 2 to 15 | 4 to 12 | 4 to 12 | 6 to 10 |
| Magnesium chloride, calcium chloride | 0.3 to 8 | 0.3 to 8 | 0.4 to 6 | 0.5 to 4 |
| White pigment | 0.01 to 2 | 0.02 to 1.6 | 0.02 to 1.6 | 0.05 to 1.2 |
| Total solvent | 8 to 35 | 12 to 32 | 12 to 32 | 15 to 30 |
| Organic solvent | 7 to 20 | 7 to 20 | 10 to 18 | 10 to 18 |
| Water | <18 | <18 | <15 | <15 |
| Misc. | to make up to 100 | to make up to 100 | to make up to 100 | to make up to 100 |

*preferably $C_{8-18}$ alkylbenzene sulfonates

**co-surfactant which differs from the non-ionic surfactant and is selected from the group consisting of alkoxylated primary $C_8$-$C_{18}$ alcohols having a degree of alkoxylation of ≤3, aliphatic $C_6$-$C_{14}$ alcohols, aromatic $C_6$-$C_{14}$ alcohols, aliphatic $C_6$-$C_{12}$ dialcohols, monoglycerides of $C_{12}$-$C_{18}$ fatty acids, monoglycerol ethers of $C_8$-$C_{18}$ fatty alcohols, in particular from the group of alkoxylated primary $C_{12}$-$C_{18}$ alcohols having a degree of alkoxylation of ≤3

***primary $C_{12-18}$ alcohols having a degree of alkoxylation of ≥4, preferably primary $C_{12-18}$ alcohols having 7 EO

****alkoxylated primary $C_{12}$-$C_{18}$ alcohols having a degree of alkoxylation of ≤3, preferably $C_{13}$ alcohols having 2 EO or 3 EO The flowable washing agent preparation preferably has a viscosity (21° C., Brookfield viscometer type DV-II Pro, spindle no. 2, 20 rpm) above 400 mPas, preferably above 1000 mPas.

The flowable washing agent preparation is preferably designed in the form of a structured system. The main types of structured system used in practice are based on dispersed lamellar, spherulitic and attenuated lamellar phases. The flowable washing agent preparation preferably contains a spherulitic phase. Spherulitic phases comprise spherical bodies, commonly referred to in the art as spherulites, in which surfactant bilayers are arranged as concentric shells. The spherulites are dispersed in an aqueous phase in the manner of a conventional emulsion, and interact to form a structured system. Preferred flowable washing agent preparations comprise lamellar spherulites, preferably having a maximum diameter of from 10 to 100 μm, particularly preferably having a maximum diameter of from 25 to 50 μm.

The flowable washing agent preparation preferably has a yield point (TA Instruments rotation rheometer AR 2000, 20° C., cone plate with 40-mm diameter, 2° cone angle) above 0.1 Pa, preferably above 0.3 Pa.

The rheological properties of the first flowable washing agent preparation are the basis for its efficient processability and also form the basis of its advantageous optical properties, including its cloudy-white appearance.

The Nephelometric Turbidity Unit (NTU) is frequently used as an indication of transparency. It is a unit used e.g. in water treatment for measuring turbidity e.g. in liquids. It is a unit of turbidity measured using a calibrated nephelometer.

High NTU values are measured for turbid compositions, whereas low values are determined for clear compositions.

The HACH Turbidimeter 2100Q from Hach Company, Loveland, Colorado (USA) is used with the calibration substances StabICal Solution HACH (20 NTU), StabICal Solution HACH (100 NTU) and StabICal Solution HACH (800 NTU), all of which can also be ordered from the Hach Company. The measurement is filled with the composition to be analyzed in a 10-mL measuring cuvette having a cap and is carried out at 20° C.

At an NTU value (at 20° C.) of 60 or more, shaped bodies have a perceptible turbidity within the meaning of the invention, as can be seen with the naked eye. The turbidity (HACH Turbidimeter 2100Q, 20° C., 10-mL cuvette) of the liquid, surfactant-containing washing agent is preferably above 60 NTU, particularly preferably above 100 NTU and in particular above 400 NTU.

The flowable washing agent preparation is preferably free from organic opacifying agents. “Free from,” as used in this context, means that the corresponding component is present in the preparation in an amount of <1 wt. %, preferably <0.1 wt. %, more preferably <0.01 wt. %. In particular, a component of this kind is not deliberately added. The flowable washing agent preparations preferably contain in particular no styrene-acrylate copolymers (INCI: styrene/acrylates copolymer).

The flowable washing agent preparation can be free from enzymes and/or fragrances. These components are in particular not contained because they can adversely affect the turbidity and thus the appearance of the formulation.

For example, flowable washing agent preparations which contain, based on the total weight thereof, less than 2 wt. %, preferably less than 1 wt. %, particularly preferably less than 0.1 wt. % and in particular no enzyme preparation are preferred.

Flowable washing agent preparations which contain, based on the total weight thereof, less than 2 wt. %, preferably less than 1 wt. %, particularly preferably less than 0.1 wt. % and in particular no fragrance are also preferred.

In an alternative embodiment, the flowable washing agent preparation contains at least one optical brightener, preferably a stilbene-type optical brightener. This is contained in the flowable washing agent preparation, based on the total weight thereof, in an amount above 0 wt. %, but preferably in an amount below 1 wt. %, particularly preferably in an amount below 0.6 wt. %. Stilbene-type brighteners for use in the flowable washing agent preparation are preferably selected from the group of triazinyl derivatives of 4,4'-diamino-2,2'-stilbenesulfonic acid. The economically most important stilbene derivatives are DAS1 (disodium 4,4-bis[(4-anilino-6-morpholino-1,3,5-triazin-2-yl)amino]stilbene-2,2-disulfonate) and DSBP (disodium 4,4-bis(2-sulfostyryl) biphenyl).

Alternatively or additionally, the flowable washing agent preparation can comprise at least one blue or violet dye. This is contained in the flowable washing agent preparation, based on the total weight thereof, in an amount above 0 wt. %, but preferably in an amount below 0.1 wt. %, particularly preferably below 0.02 wt. %, for example between 0.001 and 0.01 wt. %. A dye of this kind is used, for example, for the purpose of masking a possible yellowish hue in the preparation.

In a particularly preferred embodiment, the flowable washing agent preparation is enclosed in a water-soluble film so as to form a washing agent portion unit. Corresponding washing agent portion units comprise a) at least one first receiving chamber,
b) at least one water-soluble film surrounding this first receiving chamber, and
c) at least one flowable washing agent preparation according to the invention located in the first receiving chamber.

It is preferable to shape the water-soluble film in a deep-drawing apparatus and to combine it with the liquid washing agent to form a washing agent portion unit.

The water-soluble film in which the flowable washing agent preparation is packaged can comprise one or more structurally different water-soluble polymer(s). Particularly suitable water-soluble polymer(s) include polymers from the group of (optionally acetalized) polyvinyl alcohols (PVAL) and the copolymers thereof.

Water-soluble films for producing the water-soluble wrapping are preferably based on a polyvinyl alcohol or a polyvinyl alcohol copolymer of which the molecular weight is in the range of from 10,000 to 1,000,000 $gmol^{-1}$, preferably from 20,000 to 500,000 $gmol^{-1}$, particularly preferably from 30,000 to 100,000 $gmol^{-1}$, and in particular from 40,000 to 80,000 $gmal^{-1}$.

The production of polyvinyl alcohol and polyvinyl alcohol copolymers generally includes the hydrolysis of intermediate polyvinyl acetate. Preferred polyvinyl alcohols and polyvinyl alcohol copolymers have a degree of hydrolysis of 70 to 100 mol. %, preferably 80 to 90 mol. %, particularly preferably 81 to 89 mol. %, and in particular 82 to 88 mol. %.

Polyvinyl alcohol copolymers which include, in addition to vinyl alcohol, an ethylenically unsaturated carboxylic acid, or the salt or ester thereof, are preferred. Polyvinyl alcohol copolymers of this kind particularly preferably contain, in addition to vinyl alcohol, sulfonic acids such as 2-acrylamido-2-methyl-1-propane sulfonic acid (AMPS), acrylic acid, methacrylic acid, acrylic acid ester, methacrylic acid ester or mixtures thereof; of the esters, Ci-4 alkyl esters or Ci-4 hydroxyalkyl esters are preferred. Other suitable monomers are ethylenically unsaturated dicarboxylic acids, for example itaconic acid, maleic acid, fumaric acid and mixtures thereof.

Suitable water-soluble films are sold, for example, by MonoSol LLC under the names M8630, M8720, M8310, C8400 or M8900. Other suitable films include films named Solublon® PT, Solublon® GA, Solublon® KC or Solublon® KL from Aicello Chemical Europe GmbH or the VF-HP films from Kuraray.

The water-soluble films can contain additional active ingredients or fillers, but also plasticizers and/or solvents, in particular water, as further ingredients.

The group of further active ingredients includes, for example, materials which protect the ingredients of the preparation (A) enclosed by the film material from decomposition or deactivation by light irradiation. Antioxidants, UV absorbers and fluorescent dyes have proven to be particularly suitable for this.

Glycerol, ethylene glycol, diethylene glycol, propanediol, 2-methyl-1,3-propanediol, sorbitol or mixtures thereof, for example, can be used as plasticizers.

To reduce its coefficient of friction, the surface of the water-soluble film can optionally be powder-coated with fine powder. Sodium aluminosilicate, silica, talc and amylose are examples of suitable powdering agents.

It is particularly preferred if the washing agent portion unit has a plurality of receiving chambers.

The plurality of receiving chambers of the washing agent portion unit can be arranged spatially one next to the other or one above the other (stacked). These technical advantages are particularly evident in washing agent portion units comprising receiving chambers which enclose one another at least in part. In preferred embodiments, the washing agent portion unit has at least two receiving chambers which enclose one another at least in part. It is also very particularly preferred if the washing agent portion unit has at least one further receiving chamber which is filled with a colored washing agent preparation.

A washing agent portion unit which is preferred according to the invention has at least two receiving chambers which are surrounded by a water-soluble film, one receiving chamber being filled with the flowable washing agent preparation and the other receiving chamber being filled with a second colored washing agent preparation that differs from the flowable washing agent preparation.

A further exemplary preferred washing agent portion unit comprises at least three receiving chambers which are surrounded by a water-soluble film, one receiving chamber being filled with the flowable washing agent preparation and at least two further receiving chambers, separated from one another, being filled with a second and a third colored washing agent preparation which differ from one another and from the flowable washing agent preparation.

In an alternative embodiment, the washing agent portion unit has at least four receiving chambers which are surrounded by a water-soluble film, one receiving chamber being filled with the flowable washing agent preparation and the further three receiving chambers, separated from one another, being filled with a second and a third and a fourth colored washing agent preparation which differ from one another and from the flowable washing agent preparation.

This application also relates to a method for cleaning textiles, in which a flowable washing agent preparation described above or a washing agent portion unit described above is introduced into the washing liquor of a textile washing machine.

This application provides the following subjects, inter alia:

1. A flowable washing agent preparation containing, based on the total weight thereof,
   i) 20 to 80 wt. % surfactant;
   ii) 2 to 15 wt. % fatty acid;
   iii) 0.3 to 8 wt. % of the salt of a divalent cation;
   iv) 0.01 to 2 wt. % pigment;
   v) 8 to 35 wt. % solvent.
2. The flowable washing agent preparation according to point 1, wherein the flowable washing agent preparation contains, based on the total weight thereof, 30 to 75 wt. %, preferably 40 to 70 wt. %, surfactant.
3. The flowable washing agent preparation according to one of the preceding points, wherein the flowable washing agent preparation contains, based on the total weight thereof, 20 to 60 wt. %, preferably 25 to 50 wt. %, anionic surfactant.
4. The flowable washing agent preparation according to one of the preceding points, wherein at least one anionic surfactant, preferably at least one anionic surfactant from the group consisting of $C_{8-18}$ alkylbenzene sulfonates, $C_{8-18}$ olefin sulfonates, $C_{12-18}$ alkane sulfonates, $C_{8-18}$ ester sulfonates, $C_{8-18}$ alkyl sulfates, $C_{8-18}$ alkenyl sulfates, fatty alcohol ether sulfates, in particular at least one anionic surfactant from the group of $C_{8-18}$ alkylbenzene sulfonates, is contained as the surfactant.
5. The flowable washing agent preparation according to one of the preceding points, wherein the flowable washing agent preparation contains, based on the total weight thereof, 4 to 12 wt. %, preferably 6 to 10 wt. %, fatty acid.
6. The flowable washing agent preparation according to one of the preceding points, wherein the fatty acid is selected from the group of caprylic acid, capric acid, lauric acid, myristic acid, palmitic acid, stearic acid, oleic acid, linoleic acid and mixtures thereof.
7. The flowable washing agent preparation according to one of the preceding points, wherein the flowable washing agent preparation contains, based on the total weight thereof, 0.4 to 6 wt. %, preferably 0.5 to 4 wt. %, of a divalent salt.
8. The flowable washing agent preparation according to one of the preceding points, wherein the salt of a divalent cation is selected from the group of magnesium and calcium salts, preferably from the group of magnesium chloride, magnesium sulfate, calcium chloride and calcium sulfate, in particular from the group of magnesium chloride and calcium chloride.
9. The flowable washing agent preparation according to one of the preceding points, wherein the flowable washing agent preparation contains, based on the total weight thereof, 0.02 to 1.6 wt. %, preferably 0.05 to 1.2 wt. %, pigment.
10. The flowable washing agent preparation according to one of the preceding points, wherein the pigment is selected from the group of white pigments, preferably from the group of white pigments having a refractive index above 1.8, in particular above 2.0.
11. The flowable washing agent preparation according to one of the preceding points, wherein the pigment is selected from the group of titanium dioxide and zinc oxide.
12. The flowable washing agent preparation according to one of the preceding points, containing, based on the total weight thereof,
    i) 20 to 80 wt. % surfactant including 20 to 50 wt. % anionic surfactant;
    ii) 4 to 12 wt. % fatty acid;
    iii) 0.5 to 4 wt. % of the salt of a divalent cation;
    iv) 0.01 to 2 wt. % pigment;
    v) 8 to 35 wt. % solvent.
13. The flowable washing agent preparation according to one of the preceding points, wherein the flowable washing agent preparation contains, based on the total weight thereof, 12 to 32 wt. %, preferably 15 to 30 wt. %, solvent.
14. The flowable washing agent preparation according to one of the preceding points, wherein the flowable washing agent preparation contains, based on the total weight thereof, 7 to 20 wt. %, preferably 10 to 18 wt. %, organic solvent.
15. The flowable washing agent preparation according to one of the preceding points, wherein the organic solvent is selected from the group of ethanol, n-propanol, propanol, butanols, glycol, propanediol, butanediol, methylpropanediol, glycerol, diglycol, propyl diglycol, butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether, propylene glycol propyl ether, dipropylene glycol mono methyl ether, dipropylene glycol mono ethyl ether, methoxytriglycol, ethoxytriglycol, butoxytriglycol, 1-butoxyethoxy-2-propanol, 3-methyl-3-methoxybutanol, propylene-glycol-t-butylether, di-n-octylether and mixtures thereof, preferably from the group of propanediol, glycerol and mixtures thereof.
16. The flowable washing agent preparation according to one of the preceding points, wherein the flowable washing agent preparation contains, based on the total weight thereof, less than 18 wt. %, preferably less than 15 wt. %, water.

17. The flowable washing agent preparation according to one of the preceding points, further containing, based on the total weight thereof,
   vi) 0.5 to 4 wt. %, preferably 0.5 to 3 wt. % and in particular 0.5 to 2 wt. %, of the salt of a monovalent cation.
18. The flowable washing agent preparation according to point 17, wherein the salt of a monovalent cation is selected from the group of the salts of monovalent metal cations, preferably from the group of sodium chloride, potassium chloride, sodium sulfate, sodium carbonate, potassium sulfate, potassium carbonate, sodium hydrogen carbonate, potassium hydrogen carbonate, very preferably from the group of sodium chloride.
19. The flowable washing agent preparation according to one of the preceding points, containing, based on the total weight thereof,
   i) 20 to 80 wt. % surfactant including 20 to 50 wt. % anionic surfactant;
   ii) 4 to 12 wt. % fatty acid;
   iii) 0.5 to 4 wt. % of the salt of a divalent cation;
   iv) 0.01 to 2 wt. % pigment;
   v) 8 to 35 wt. % solvent;
   vi) 0.5 to 4 wt. % of the salt of a monovalent metal cation.
20. The flowable washing agent preparation according to one of the preceding points, containing, based on the total weight thereof, 12 to 30 wt. %, preferably 15 to 25 wt. %, non-ionic surfactant.
21. The flowable washing agent preparation according to one of the preceding points, wherein at least one non-ionic surfactant from the group of alkoxylated primary $C_{8-18}$ alcohols having a degree of alkoxylation of ≥4, particularly preferably the $C_{12-14}$ alcohols having 4 EO or 7 EO, the $C_{9-11}$ alcohols having 7 EO, the $C_{13-15}$ alcohols having 5 EO, 7 EO or 8 EO, the $C_{13-15}$ oxo alcohols having 7 EO, the $C_{12-18}$ alcohols having 5 EO or 7 EO, the $C_{13-15}$ oxo alcohols having 7 EO, in particular the primary $C_{12-18}$ alcohols having a degree of alkoxylation of ≥4, very particularly preferably the primary $C_{12-18}$ alcohols having 7 EO, is contained as the surfactant.
22. The flowable washing agent preparation according to one of the preceding points, wherein the flowable washing agent preparation contains anionic surfactant and non-ionic surfactant in a weight ratio of from 3:1 to 1:2, preferably from 2:1 to 1:1.5 and in particular from 1.4:1 to 1:1.
23. The flowable washing agent preparation according to one of the preceding points, further containing, based on the total weight thereof,
   vii) 0.3 to 5 wt. % of a co-surfactant selected from the group consisting of alkoxylated primary $C_8$-$C_{18}$ alcohols having a degree of alkoxylation of ≤3, aliphatic $C_6$-$C_{14}$ alcohols, aromatic $C_6$-$C_{14}$ alcohols, aliphatic $C_6$-$C_{12}$ dialcohols, monoglycerides of $C_{12}$-$C_{18}$ fatty acids, monoglycerol ethers of $C_8$-$C_{18}$ fatty alcohols, in particular from the group of alkoxylated primary $C_{12}$-$C_{18}$ alcohols having a degree of alkoxylation of ≤3.
24. The flowable washing agent preparation according to one of the preceding points, containing, based on the total weight thereof,
   i) 32.3 to 80 wt. % surfactant including 20 to 50 wt. % anionic surfactant and 12 to 30 wt. % non-ionic surfactant;
   ii) 4 to 12 wt. % fatty acid;
   iii) 0.5 to 4 wt. % of the salt of a divalent cation;
   iv) 0.01 to 2 wt. % pigment;
   v) 8 to 35 wt. % solvent.
   vi) 0.3 to 5 wt. % of a co-surfactant that differs from the non-ionic surfactant and is selected from the group consisting of alkoxylated primary $C_8$-$C_{18}$ alcohols having a degree of alkoxylation of 3, aliphatic $C_6$-$C_{14}$ alcohols, aromatic $C_6$-$C_{14}$ alcohols, aliphatic $C_6$-$C_{12}$ dialcohols, monoglycerides of $C_{12}$-$C_{18}$ fatty acids, monoglycerol ethers of $C_8$-$C_{18}$ fatty alcohols, in particular from the group of alkoxylated primary $C_{12}$-Cis alcohols having a degree of alkoxylation of ≤3.
25. The flowable washing agent preparation according to one of the preceding points, wherein the washing agent preparation does not contain any organic opacifying agents, in particular does not contain any styrene-acrylate copolymer.
26. The flowable washing agent preparation according to one of the preceding points, wherein the flowable washing agent preparation contains, based on the total weight thereof, less than 2 wt. %, preferably less than 1 wt. %, particularly preferably less than 0.1 wt. % and in particular no enzyme preparation.
27. The flowable washing agent preparation according to one of the preceding points, wherein the flowable washing agent preparation contains, based on the total weight thereof, less than 2 wt. %, preferably less than 1 wt. %, particularly preferably less than 0.1 wt. % and in particular no fragrance.
28. The flowable washing agent preparation according to one of the preceding points, wherein the flowable washing agent preparation contains, based on the total weight thereof, an optical brightener, preferably a stilbene-type optical brightener, in amounts below 1 wt. %, preferably in amounts below 0.6 wt. %.
29. The flowable washing agent preparation according to point 28, wherein the optical brightener is selected from the group of triazinyl derivatives of 4,4'-diamino-2,2'-stilbenesulfonic acid, in particular DAS1 (disodium 4,4-bis[(4-anilino-6-morpholino-1,3,5-triazin-2-yl)amino] stilbene-2,2-disulfonate) and DSBP (di sodium 4,4-bis(2-sulfostyryl)biphenyl).
30. The flowable washing agent preparation according to one of the preceding points, wherein the flowable washing agent preparation contains, based on the total weight thereof, a blue or violet dye in amounts below 0.1 wt. %, preferably below 0.02 wt. %.
31. The flowable washing agent preparation according to one of the preceding points, wherein the flowable washing agent preparation has a viscosity (21° C., Brookfield viscometer type DV-II Pro, spindle no. 2, 20 rpm) above 400 mPas, preferably above 1000 mPas.
32. The flowable washing agent preparation according to one of the preceding points, wherein the flowable washing agent preparation has a yield point (TA Instruments rotation rheometer AR 2000, 20° C., cone plate with 40-mm diameter, 2° cone angle) above 0.1 Pa, preferably above 0.3 Pa.
33. The flowable washing agent preparation according to one of the preceding points, wherein the flowable washing agent preparation has a turbidity (HACH Turbidimeter 2100Q, 20° C., 10-mL cuvette) above 60 NTU, preferably above 100 NTU and in particular above 400 NTU.
34. The flowable washing agent preparation according to one of the preceding points, wherein the flowable washing agent preparation contains lamellar spherulites, preferably having a maximum diameter of from 10 to 100 μm, particularly preferably having a maximum diameter of from 25 to 50 μm.

35. A washing agent portion unit comprising
a) at least one first receiving chamber,
b) at least one water-soluble film surrounding this first receiving chamber, and
c) at least one flowable washing agent preparation according to one of the preceding points located in the first receiving chamber.

36. The washing agent portion unit according to point 35, wherein the washing agent portion unit has at least two receiving chambers which are surrounded by a water-soluble film, wherein one receiving chamber is filled with the flowable washing agent preparation and the other receiving chamber is filled with a second colored washing agent preparation that differs from the flowable washing agent preparation.

37. The washing agent portion unit according to point 35, wherein the washing agent portion unit has at least three receiving chambers which are surrounded by a water-soluble film, wherein one receiving chamber is filled with the flowable washing agent preparation and the further two receiving chambers, separated from one another, are filled with a second and a third washing agent preparation which differ from one another and from the flowable washing agent preparation.

38. The washing agent portion unit according to point 35, wherein the washing agent portion unit has at least four receiving chambers which are surrounded by a water-soluble film, wherein one receiving chamber is filled with the flowable washing agent preparation and the further three receiving chambers, separated from one another, are filled with a second and a third and a fourth colored washing agent preparation which differ from one another and from the flowable washing agent preparation.

39. Method for cleaning textiles, in which a flowable washing agent preparation according to one of points 1 to 34 or a washing agent portion unit according to one of points 35 to 38 is introduced into the washing liquor of a textile washing machine.

What is claimed is:

1. A flowable washing agent preparation containing, based on the total weight thereof,
i) 20 to 80 wt. % surfactant consisting of anionic and nonionic surfactant, the anionic surfactant being 20 to 60 wt. % based on the total weight of the washing agent preparation;
ii) 2 to 15 wt. % fatty acid;
iii) 0.4 to 6 wt. % of a salt of a divalent cation;
iv) 0.01 to 2 wt. % pigment selected from the group of white pigments having a refractive index above 1.8;
v) 8 to 35 wt. % solvent; and
vi) 0.5 to 4 wt. % of a salt of monovalent metal cation;
wherein the preparation has a turbidity above 60 NTU; and
wherein the preparation is free of dyes.

2. The flowable washing agent preparation according to claim 1, wherein the flowable washing agent preparation contains, based on the total weight thereof, 30 to 75 wt. % surfactant.

3. The flowable washing agent preparation according to claim 2, wherein the flowable washing agent preparation contains, based on the total weight thereof, 40 to 70 wt. % surfactant.

4. The flowable washing agent preparation according to claim 1, wherein the salt of a divalent cation is selected from the group of magnesium and calcium salts.

5. The flowable washing agent preparation according to claim 4, wherein the salt of a divalent cation is selected from the group of magnesium chloride, magnesium sulfate, calcium chloride and calcium sulfate.

6. The flowable washing agent preparation according to claim 4, wherein the salt of a divalent cation is selected from the group of magnesium chloride and calcium chloride.

7. The flowable washing agent preparation according to claim 1, wherein the pigment is selected from the group of titanium dioxide and zinc oxide.

8. The flowable washing agent preparation according to claim 1, containing, based on the total weight thereof,
i) 20 to 80 wt. % surfactant, wherein the anionic surfactant is present in an amount from 20 to 50 wt. %;
ii) 4 to 12 wt. % fatty acid;
iii) 0.5 to 4 wt. % of the salt of a divalent cation;
iv) 0.01 to 2 wt. % pigment;
v) 8 to 35 wt. % solvent.

9. The flowable washing agent preparation according to claim 1, containing, based on the total weight thereof,
i) 20 to 80 wt. % surfactant, wherein the anionic surfactant is present in an amount from 20 to 50 wt. %;
ii) 4 to 12 wt. % fatty acid;
iii) 0.5 to 4 wt. % of the salt of a divalent cation;
iv) 0.01 to 2 wt. % pigment;
v) 8 to 35 wt. % solvent;
vi) 0.5 to 4 wt. % of the salt of a monovalent metal cation.

10. The flowable washing agent preparation according to claim 1, wherein the flowable washing agent preparation contains, based on the total weight thereof, 25 to 50 wt. % anionic surfactant.

11. The flowable washing agent preparation according to claim 1, wherein the pigment is selected from the group of white pigments having a refractive index above 2.0.

12. A washing agent portion unit comprising
a) at least one first receiving chamber,
b) at least one water-soluble film surrounding this first receiving chamber, and
c) at least one flowable washing agent preparation according to claim 1, located in the first receiving chamber.

13. A method for cleaning textiles, in which a flowable washing agent preparation according to claim 1 is introduced into the washing liquor of a textile washing machine.

14. A method for cleaning textiles, in which a washing agent portion unit according to claim 12 is introduced into the washing liquor of a textile washing machine.

15. An opacified flowable washing agent preparation containing, based on the total weight thereof,
i) 20 to 80 wt. % surfactant including 20 to 60 wt. % anionic surfactant based on the total weight of the washing agent preparation;
ii) 2 to 15 wt. % fatty acid;
iii) 0.4 to 6 wt. % of a salt of a divalent cation;
iv) 0.01 to 2 wt. % white pigment;
v) 8 to 35 wt. % solvent; and
vi) 0.5 to 4 wt. % of a salt of a monovalent metal cation;
wherein the surfactant is free of amphoteric surfactant; and wherein the flowable washing preparation is free of enzymes and dyes.

16. The flowable washing agent preparation according to claim 15, wherein the pigment is selected from the group of white pigments having a refractive index above 1.8.

17. The flowable washing agent preparation according to claim 15,
wherein the surfactant consists of:
anionic surfactant,
non-ionic surfactant, and
co-surfactant selected from the group consisting of alkoxylated primary $C_8$-$C_{18}$ alcohols having a degree of alkoxylation of ≤3, aliphatic $C_6$-$C_{14}$ alcohols, aromatic $C_6$-$C_{14}$ alcohols, aliphatic $C_6$-$C_{12}$ dialcohols, monoglycerides of $C_{12}$-$C_{18}$ fatty acids, monoglycerol ethers of $C_8$-$C_{18}$ fatty alcohols.

18. The flowable washing agent preparation according to claim 15, wherein the salt of a monovalent metal cation is selected from the group consisting of sodium chloride, potassium chloride, sodium sulfate, sodium carbonate, potassium sulfate, potassium carbonate, sodium hydrogen carbonate, and potassium hydrogen carbonate.

19. The flowable washing agent preparation according to claim 15, wherein the preparation has a turbidity above 60 NTU.

* * * * *